July 31, 1923.
A. H. BOSWORTH
CONTAINER
Filed April 14, 1921
1,463,663
Fig. 1,
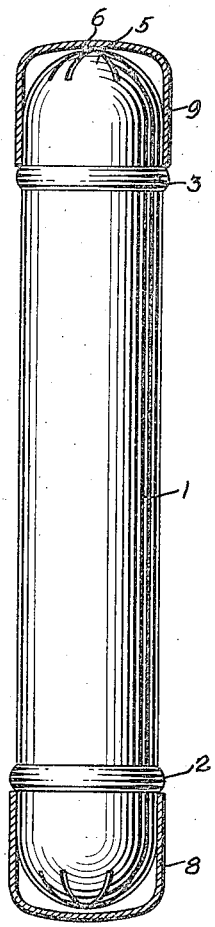
Fig. 2,
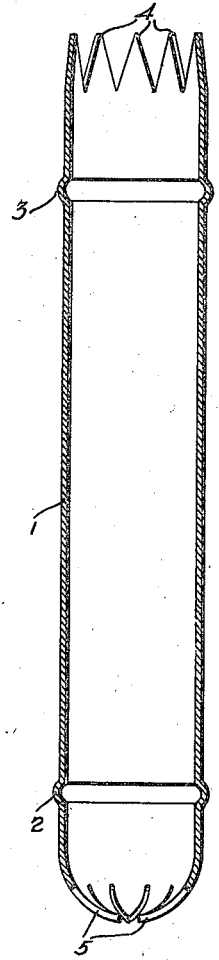
Fig. 3.
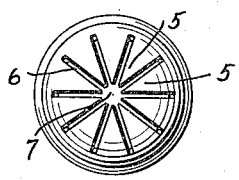
WITNESSES
Edw. Thorpe
Robert J. Hulsizer
INVENTOR
Arthur H. Bosworth
BY
ATTORNEYS Patented July 31, 1923.

1,463,663

UNITED STATES PATENT OFFICE.

ARTHUR H. BOSWORTH, OF WICHITA, KANSAS.

CONTAINER.

Application filed April 14, 1921. Serial No. 461,173.

*To all whom it may concern:*

Be it known that I, ARTHUR H. BOSWORTH, a citizen of the United States, and a resident of Wichita, in the county of Sedgwick and State of Kansas, have invented a new and Improved Container, of which the following is a full, clear, and exact description.

This invention relates to a container, and has particular reference to a container or receptacle for receiving compositions, such as menthol, to be used as an inhaler.

An object of the invention is to provide a simple, compact, efficient container which can be made much more economically than hitherto has been possible and with a minimum expenditure of time and labor.

Another object resides in the provision of means whereby the container may be made of a minimum number of parts and yet result in a strong, compact and serviceable article.

A further object resides in the particular construction and arrangement of parts which are hereinafter described and claimed and shown in the accompanying drawings.

The invention is illustrated in the drawings, of which—

Figure 1 is a side elevation of the device showing the cap portions in section;

Figure 2 is a longitudinal elevation through the body portion of the container prior to the assembly of it in its final form; and Figure 3 is a plan view of the device.

The preferred embodiment of my invention, as shown in the drawings, comprises a receptacle 1 which is of any desired shape but is preferably formed, as shown in the drawings, as a hollow cylindrical container which near the ends is provided with rolled beads 2 and 3. The end portions of the cylinder 1 are provided with a plurality of prongs or points 4 and 5, which may be cut out of the metal of the container in any desired manner and by any suitable process. These prongs are so cut that when they are bent over in the manner shown in Fig. 5 of the drawings, a plurality of slots 6 are formed between the prongs, and a central aperture such as 7 is provided substantially coincident with the longitudinal axis of the cylinder 1. Suitably drawn and formed caps, such as 8 and 9, can be made to place over the ends of the container when desired.

The cylinder or container is made of seamless tubing. It can be cut, beaded, drawn and bent by a much fewer number of operations than hitherto has been possible.

This container is adapted in one of its uses to receive medicated material, such as menthol, so that the container can be used as an inhaler. After the material is placed within the container, the prongs are bent over, as represented by the numeral 5, in order to hold the material within the container. When the container is not in use as an inhaler, the caps 8 and 9 are placed over the ends.

The fact that the container is made of one piece of material eliminates the possibility of its coming apart and spilling the material. This fact also eliminates the possibility of the container very easily being refilled with inferior goods. Also, because of this structure, the tubes can be filled more rapidly than can other styles.

It will be evident that the particular size and shape of the prongs and the tube, and final shape when assembled, are not material to the invention, various modifications in the form and arrangement and construction of the parts being possible and still be within the spirit of the invention.

What I claim is:

A container comprising a body portion in the form of an open-ended hollow cylinder made of a single piece of seamless metallic tubing, a bead formed integrally in the body portion adjacent each end, the ends of the tubing being bent or curved to partly close the ends of the tubing and a pair of stamped metallic caps adapted to fit over the ends of the tubing and close the same, said caps adapted to bear against said beads.

ARTHUR H. BOSWORTH.